US008876446B2

(12) United States Patent
Shaheen

(10) Patent No.: US 8,876,446 B2
(45) Date of Patent: Nov. 4, 2014

(54) CUTTING TOOL HAVING CLAMPING BOLT PROVIDED WITH LOCKING PORTION AND CUTTING INSERT THEREFOR

(75) Inventor: Philip Shaheen, Tarshiha (IL)

(73) Assignee: Iscar, Ltd., Tefen (IL)

( * ) Notice: Subject to any disclaimer, the term of this patent is extended or adjusted under 35 U.S.C. 154(b) by 470 days.

(21) Appl. No.: 13/432,244

(22) Filed: Mar. 28, 2012

(65) Prior Publication Data
US 2013/0259590 A1 Oct. 3, 2013

(51) Int. Cl.
B23B 51/02 (2006.01)

(52) U.S. Cl.
CPC .............. *B23B 51/02* (2013.01); *B23B 2251/02* (2013.01); *B23B 2200/3618* (2013.01); *Y10S 408/713* (2013.01)
USPC ............................ 408/233; 408/231; 408/713

(58) Field of Classification Search
CPC ................... B23B 2251/02; B23B 2200/3618; B23B 2205/04; B23B 2240/36; B24B 45/00; B24B 45/003; B24B 45/006
USPC ......... 30/329, 340, 342; 403/362, 378, 379.3, 403/379.5; 408/226, 227, 230, 231, 233, 408/713; 451/342, 344, 358, 359
See application file for complete search history.

(56) References Cited

U.S. PATENT DOCUMENTS

| 4,525,109 | A | 6/1985 | Bylund |
| 5,580,194 | A | 12/1996 | Satran et al. |
| 6,514,019 | B1 | 2/2003 | Schulz |
| 6,918,717 | B2 * | 7/2005 | Ben-Mucha .................. 407/103 |
| 7,168,893 | B2 | 1/2007 | Takiguchi |
| 2011/0110735 | A1 * | 5/2011 | Klettenheimer et al. ....... 408/57 |

FOREIGN PATENT DOCUMENTS

JP 2009 142952 7/2009

OTHER PUBLICATIONS

International Search Report dated Jul. 26, 2013 issued in PCT counterpart application (No. PCT/IL2013/050188).

* cited by examiner

*Primary Examiner* — Andrea Wellington
*Assistant Examiner* — Alan Snyder
(74) *Attorney, Agent, or Firm* — Womble Carlyle

(57) ABSTRACT

A cutting tool has a cutting insert secured in a tool shank by means of a clamping bolt, whereby two opposing side surfaces of a body portion of the cutting insert are located between two spaced apart protuberances of the tool shank. The body portion includes a cut-out extending between the two opposing side surfaces and opening out to a bottom surface. The cut-out includes an undercut with at least one undercut sub-surface with respect to a forward direction. The clamping bolt can be rotated from a locked position wherein the bolt shank has a threaded portion engaged in one of the protuberances and a bolt locking portion located directly forward of the at least one undercut sub-surface, to an unlocked position wherein the threaded portion remains engaged in the protuberance and no portion of the bolt shank is located directly forward of the at least one undercut sub-surface.

30 Claims, 6 Drawing Sheets

CUTTING TOOL HAVING CLAMPING BOLT PROVIDED WITH LOCKING PORTION AND CUTTING INSERT THEREFOR

FIELD OF THE INVENTION

The present invention relates to a cutting tool and a cutting insert for use in metal cutting processes in general, and for drilling and boring operations in particular.

BACKGROUND OF THE INVENTION

Within the field of cutting tools used in drilling and boring operations, there are many examples of cutting inserts being removably secured in a tool shank. In some instances, these cutting tools are configured such that the cutting insert is removably secured in the tool shank by means of a clamping bolt.

U.S. Pat. No. 6,514,019 discloses a boring tool comprising a holder, a cutting insert and a clamping bolt for fastening the cutting insert to a head portion of the holder. The head portion includes a groove bounded by two groove side faces formed on two groove branches. During assembly of the boring tool, the cutting insert is located in the groove, and two insert side faces on the cutting insert are clamped between the two groove side faces by the clamping bolt. The clamping bolt passes through a bore portion in a first groove branch, and also through a receiving bore in the cutting insert, before engaging an internal thread in a second groove branch. The receiving bore only opens out to the two insert side faces, and thus the cutting insert can only be removed from the holder following disengagement of the clamping bolt from the internal thread and withdrawal of the clamping bolt from the receiving bore.

U.S. Pat. No. 7,168,893 discloses a throw-away drill comprising a drill main body, a tip and a clamping bolt for fastening the tip to a tip attachment seat cut into an end portion of the drill main body. The end portion is divided into first and second end portions having a pair of internal side surfaces. During assembly of the throw-way drill, the tip is located between the first and second end portions, and a pair of outer side surfaces on the tip is clamped between the pair of internal side surfaces by the clamping bolt. The clamping bolt passes through a through hole in the first end portion, and also through a cutaway portion in the tip, before engaging a threaded portion in the second end portion.
The cutaway portion opens out to the pair of outer side surfaces and also to a rear edge face adjacent the pair of outer side surfaces, allowing the throw-way drill to be unclamped and the tip to be removed from the drill main body without disengagement of the clamping bolt from the threaded portion. The cutaway portion includes no safety feature to prevent the tip from being inadvertently 'pulled' from the drill main body.

SUMMARY OF THE INVENTION

In accordance with the present invention, there is provided a cutting tool comprising a cutting insert removably securable in a tool shank by means of a clamping bolt;
the tool shank extending along a longitudinal axis, and having spaced apart first and second protuberances protruding from an end portion thereof;
the first protuberance having a through bore and the second protuberance having a threaded bore, the through bore and the threaded bore extending coaxially along a bore axis,
the cutting insert having a body portion and a cutting portion;
the body portion having a cut-out extending along a cut-out axis from a first side surface to an opposing second side surface and opening out to a bottom surface extending therebetween, the cut-out including at least one undercut, and
the clamping bolt having a bolt shank extending away from a bolt head along a bolt axis;
the bolt shank having a threaded portion distal from the bolt head and at least one bolt locking portion,
wherein:
the first and second side surfaces are located between the first and second protuberances, and each of the at least one undercut has at least one undercut sub-surface with respect to a forward direction, and
wherein the clamping bolt can be rotated about its bolt axis;
from a locked position wherein the threaded portion is threadingly engaged in the threaded bore and the at least one bolt locking portion is located directly forward of the at least one undercut sub-surface of one of the at least one undercut,
to an un-locked position wherein the threaded portion remains threadingly engaged in the threaded bore and no portion of the bolt shank is located directly forward of any of the at least one undercut sub-surface of any of the at least one undercut.

Also in accordance with the present invention, there is provided a cutting insert comprising a body portion and a cutting portion;
the body portion having a cut-out extending along a cut-out axis from a first side surface to an opposing second side surface and opening out to a bottom surface extending therebetween;
the cut-out including at least one undercut, and the at least one undercut having at least one undercut sub-surface with respect to a forward direction, the cutting portion located forward of the body portion along a central axis,
wherein one of the at least one undercut sub-surface of each of the at least one undercut does not intersect either one of the first and second side surfaces.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

The present invention relates to a cutting tool 20 comprising a cutting insert 22 removably securable in a tool shank 24 by means of a clamping bolt 26.

In some embodiments of the present invention, the cutting tool 20 may be in the form of a rotary cutting tool. As shown in FIGS. 1 to 4, the cutting tool 20 may be in the form of a drill.

Also, in some embodiments of the present invention, the tool shank 24 may be manufactured from machined steel, and the cutting insert 22 may preferably be manufactured by form pressing and sintering a cemented carbide, such as tungsten carbide, and may be coated or uncoated.

Figure 5:
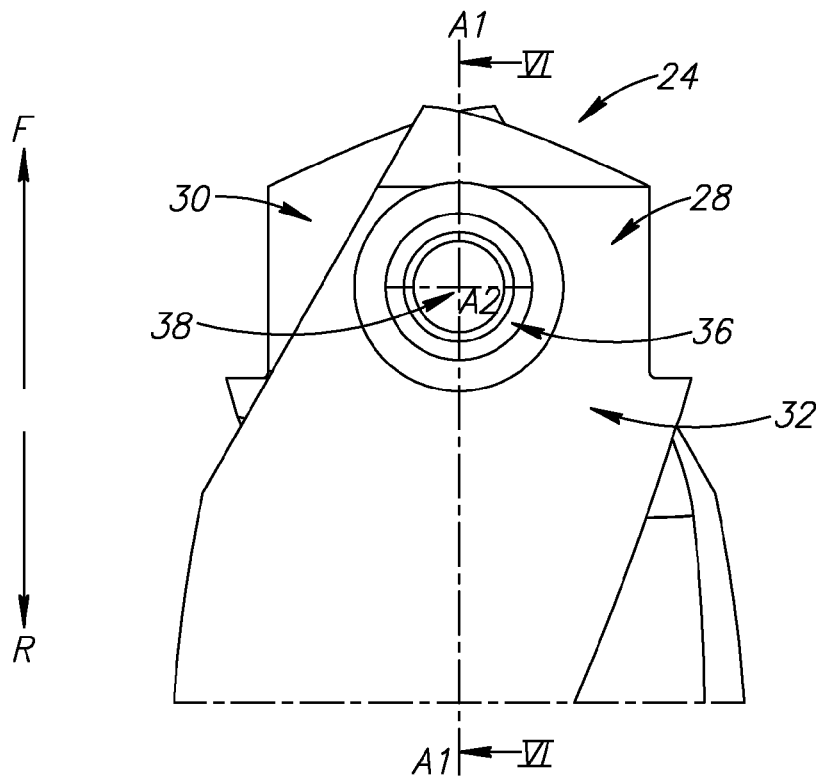
FIG. 5 is a side view of a tool shank in accordance with some embodiments of the present invention.
Figure 6:
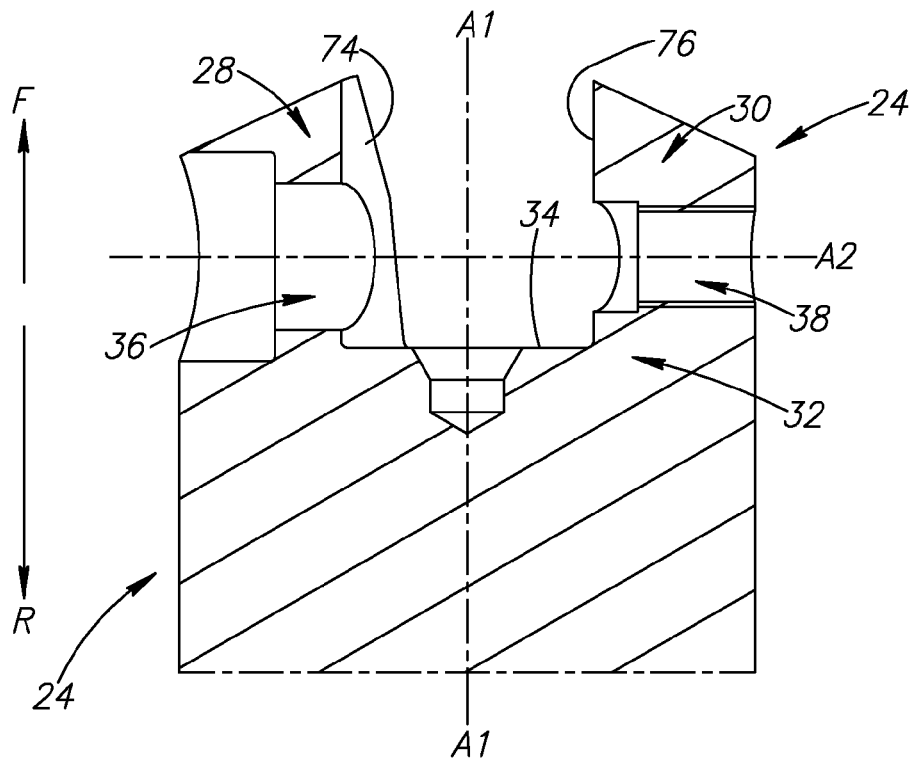
FIG. 6 is a cross-sectional view of the tool shank shown in FIG. 5, taken along the line VI-VI.

According to the present invention, as shown in FIGS. 5 and 6, the tool shank 24 extends along a longitudinal axis A1, and has spaced apart first and second protuberances 28, 30 protruding from an end portion 32 thereof.

In some embodiments of the present invention, the first and second protuberances 28, 30 may protrude from the end portion 32 in a forward direction F.

Also, in some embodiments of the present invention, the longitudinal axis A1 may be parallel to the forward direction F.

Further, in some embodiments of the present invention, the end portion 32 may have a front surface 34 between the spaced apart first and second protuberances 28, 30, with the front surface 34 substantially facing in the forward direction F.

According to the present invention, as shown in FIGS. 5 and 6, the first protuberance 28 has a through bore 36 and the second protuberance 30 has a threaded bore 38, with the through bore 36 and the threaded bore 38 extending coaxially along a bore axis A2.

In some embodiments of the present invention, the threaded bore 38 may be integral to the second protuberance 30. In other embodiments of the present invention (not shown), the threaded bore 38 may be formed on an auxiliary component.

Also, in some embodiments of the present invention, the bore axis A2 may be perpendicular to the longitudinal axis A1.

According to the present invention, as shown in FIGS. 7 to 11, the cutting insert 22 has a body portion 40 and a cutting portion 42, the body portion 40 having a cut-out 44 extending along a cut-out axis A3 from a first side surface 46 to an opposing second side surface 48 and opening out to a bottom surface 50 extending therebetween, and the cut-out 44 including at least one undercut 52.

In some embodiments of the present invention, the cutting insert 22 may have a single cutting portion 42.

Also, in some embodiments of the present invention, the cut-out 44 may exhibit two-fold rotational symmetry about a central axis A4.

Further, in some embodiments of the present invention, the cutting insert 22 may exhibit two-fold rotational symmetry about the central axis A4.

Figure 1:
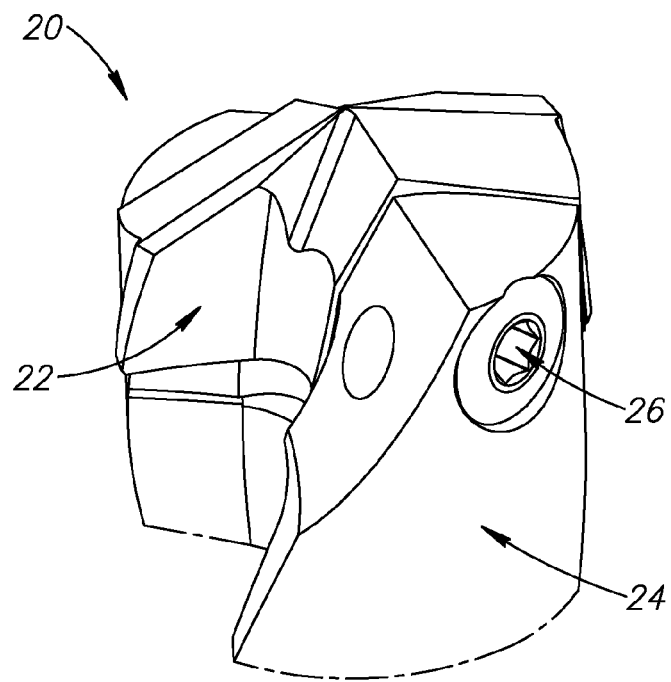
FIG. 1 is a perspective view of a cutting tool in accordance with some embodiments of the present invention.
Figure 2:
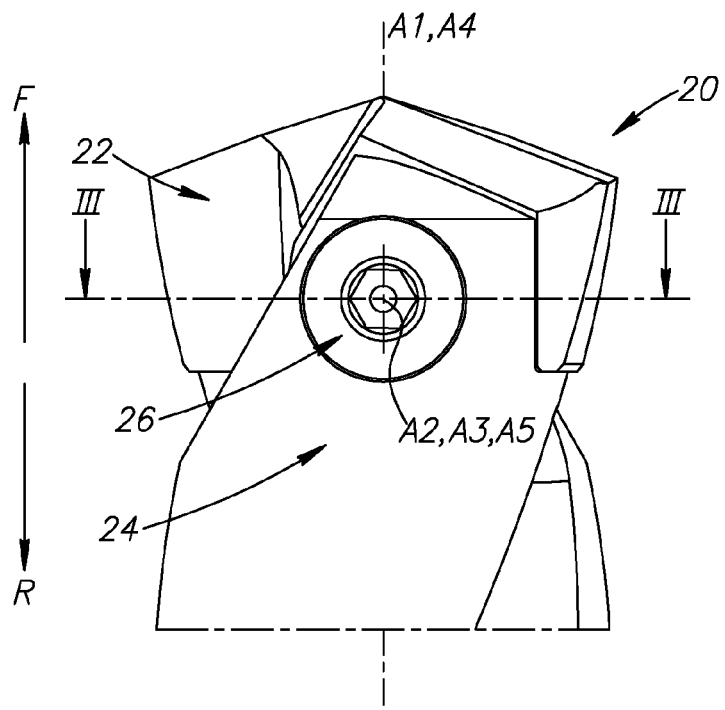
FIG. 2 is a side view of a cutting tool in accordance with some embodiments of the present invention.
Figure 3:
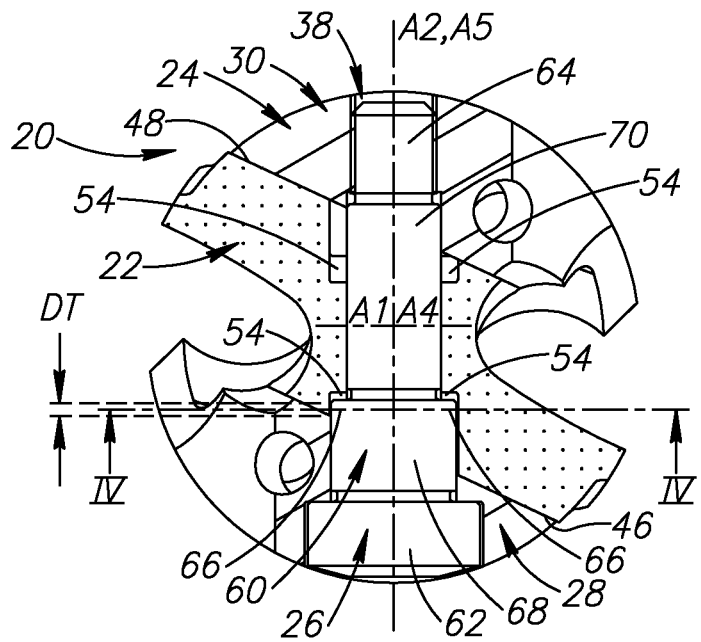
FIG. 3 is a cross-sectional view of the cutting tool shown in FIG. 2, taken along the line III-III.

As shown in FIGS. 2 and 3, the central axis A4 may be coaxial with the longitudinal axis A1.

Figure 4:
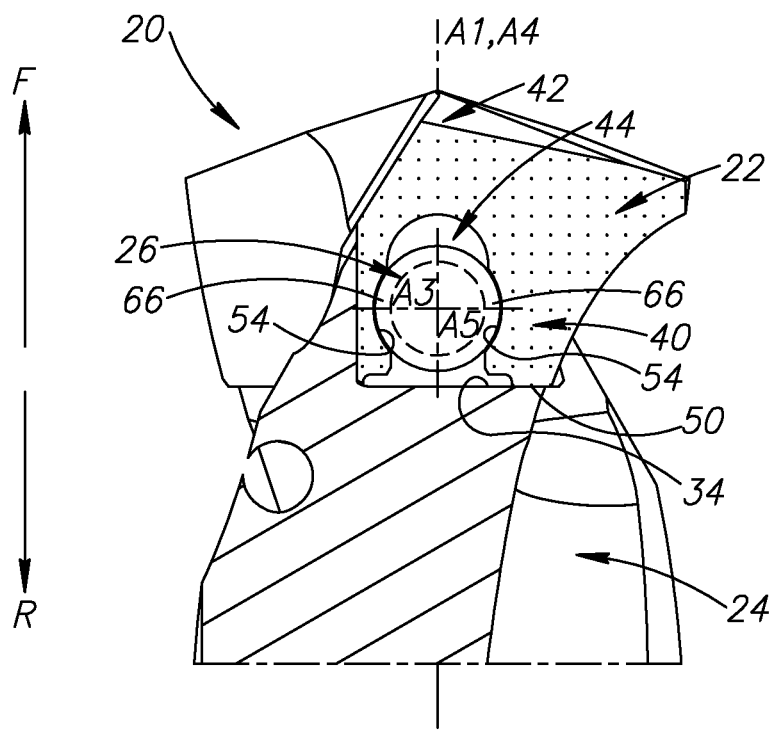
FIG. 4 is a cross-sectional view of the cutting tool shown in FIG. 3, taken along the line IV-IV.

According to the present invention, as shown in FIGS. 2 to 4, the first and second side surfaces 46, 48 are located between the first and second protuberances 28, 30, and each of the at least one undercut 52 has at least one undercut sub-surface 54 with respect to the forward direction F.

It should be appreciated that use of the term "undercut" throughout the description and claims refers to a recess or passage, where a straight line extending in a certain direction away from a given sub-surface of the recess or passage intersects another sub-surface of the same recess or passage.

Thus, each undercut 52 also includes a counterpart undercut sub-surface 56 with respect to a rearward direction R opposite to the forward direction F.

In some embodiments of the present invention, the cutting portion 42 may be located forward of the body portion 40 along the central axis A4.

Also, in some embodiments of the present invention, the front surface 34 may be in contact with the bottom surface 50, with the front surface 34 providing an axial stopper for the cutting insert 22 in the rearward direction R.

Further, in some embodiments of the present invention, the first and second side surfaces 46, 48 may be planar and parallel to the forward direction F.

Figure 9:
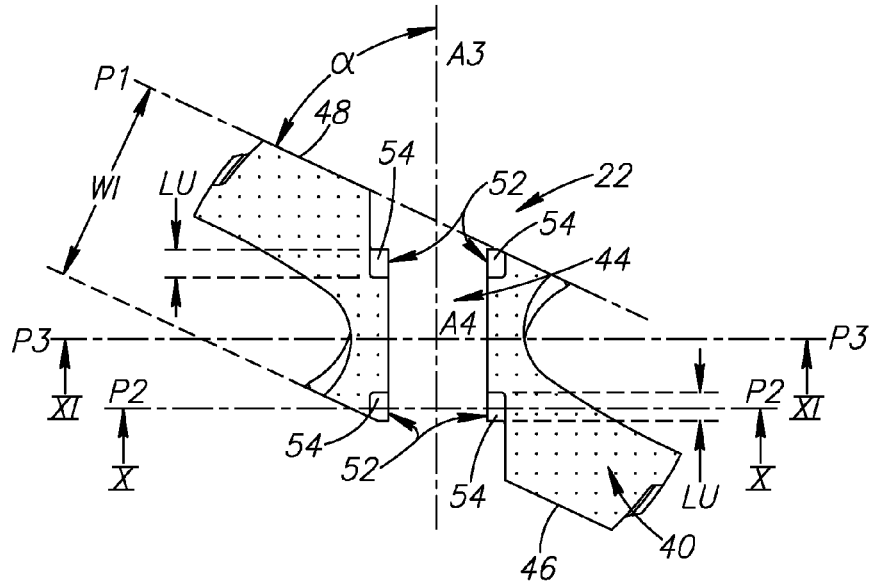
FIG. 9 is a cross-sectional view of the cutting insert shown in FIG. 7, taken along the line IX-IX.

As shown in FIG. 9, the cut-out axis A3 may form an acute first angle α with a first plane P1 parallel to the first and second side surfaces 46, 48, and the first angle α may be typically greater than 45°.

In some embodiments of the present invention, the cut-out 44 may have exactly two undercuts 52, and each undercut 52 may have exactly two undercut sub-surfaces 54.

Figure 7:
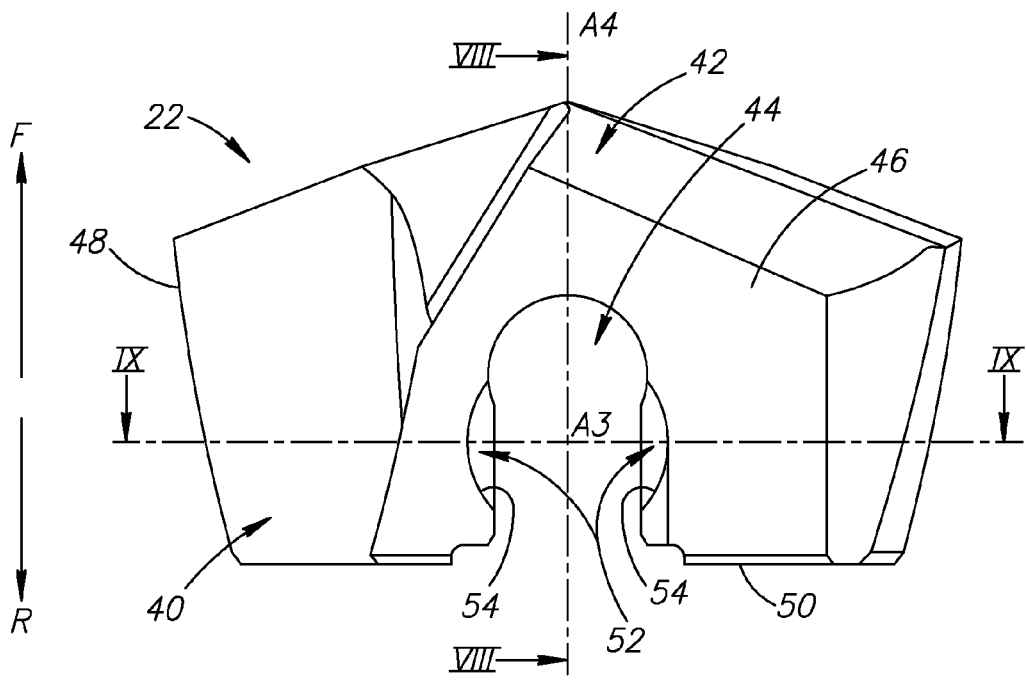
FIG. 7 is a side view of a cutting insert in accordance with some embodiments of the present invention.

In a side view of the cutting insert 22 along the cut-out axis A3, as shown in FIG. 7, it can be appreciated that the two undercut sub-surfaces 54 associated with each undercut 52 may be spaced apart.

Figure 8:
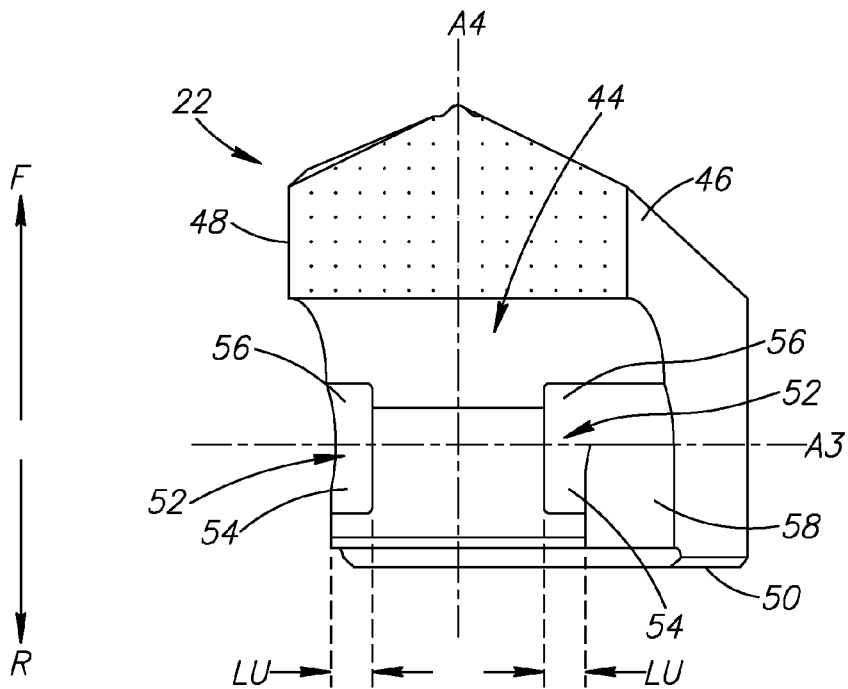
FIG. 8 is a cross-sectional view of the cutting insert shown in FIG. 7, taken along the line VIII-VIII.

It can also be appreciated from FIGS. 7 and 8, that each undercut 52 may be visible in only one of two side views of the cutting insert 22 along the cut-out axis A3.

Figure 10:
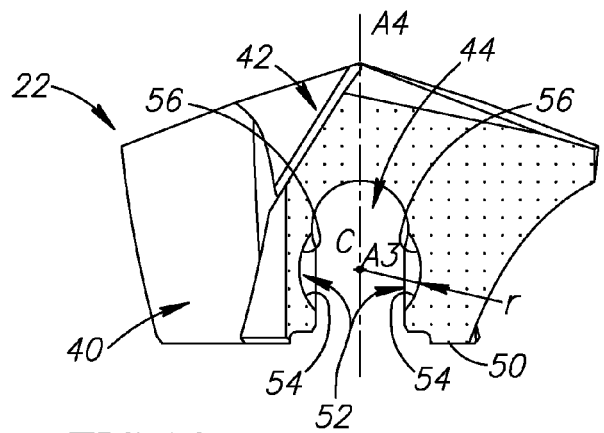
FIG. 10 is a cross-sectional view of the cutting insert shown in FIG. 9, taken along the line X-X.

As shown in FIG. 10, in a cross-sectional view taken in a second plane P2 perpendicular to the cut-out axis A3 and intersecting one of the two undercuts 52, the two associated undercut sub-surfaces 54 may each have a constant undercut radius r with a center point C contained in the cut-out axis A3.

It can be appreciated from FIGS. 9 and 10, that the two undercut sub-surfaces 54 of each undercut 52 may be substantially parallel to the cut-out axis A3.

It can be appreciated from FIG. 9, that one of the two undercut sub-surfaces 54 of each undercut 52 may be recessed from an associated side surface 46, 48 along the cut-out axis A3 and thus not intersect either one of the first and second side surfaces 46, 48.

As shown in FIGS. 8 and 9, the two undercut sub-surfaces 54 of each undercut 52 may extend an undercut length LU along the cut-out axis A3, the cutting insert 22 may have an insert width WI between the first and second side surfaces 46, 48, and the undercut length LU may be less than a fifth of the insert width WI.

For embodiments of the present invention, as shown in FIGS. 8 and 9, where the cut-out axis A3 forms an acute first angle α with the first plane P1 parallel to the first and second side surfaces 46, 48, and the two undercut sub-surfaces 54 of each undercut 52 extend the same undercut length LU with respect to the cut-out axis A3, a local cut-out 58 extends from one of the two undercut sub-surfaces 54 of each undercut 52 to intersect one of the first and second side surfaces 46, 48. Each local cut-out 58 has no undercut sub-surface with respect to the forward direction F.

Figure 12:
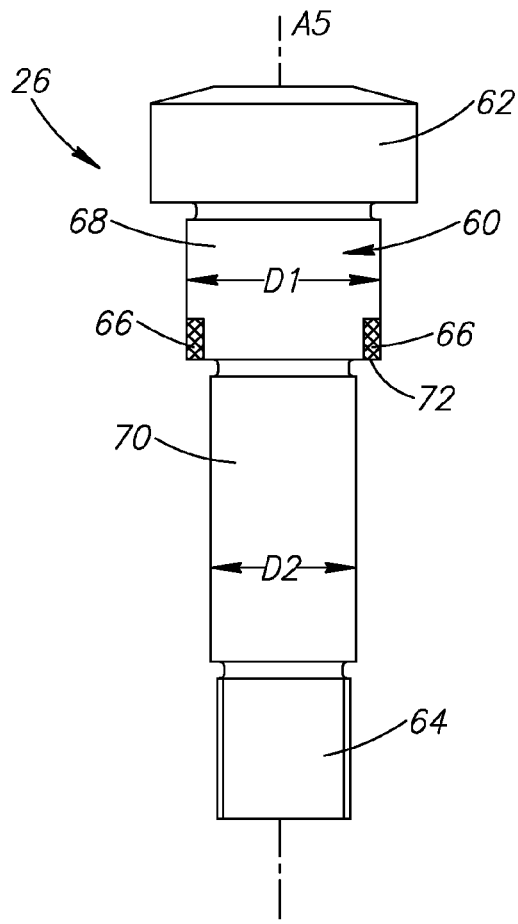
FIG. 12 is a side view of a clamping bolt in accordance with some embodiments of the present invention.
Figure 13:
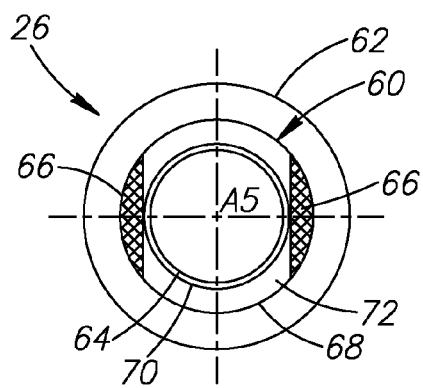
FIG. 13 is an end view of the clamping bolt shown in FIG. 12.

According to the present invention, as shown in FIGS. 12 and 13, the clamping bolt 26 has a bolt shank 60 extending away from a bolt head 62 along a bolt axis A5, and the bolt shank 60 has a threaded portion 64 distal from the bolt head 62 and at least one bolt locking portion 66.

In some embodiments of the present invention, as shown in FIGS. 2 and 3, in the assembled tool, the bolt axis A5 may be coaxial with the bore axis A2.

Also, in some embodiments of the present invention, as shown in FIGS. 2 and 4, the cut-out axis A3 may be coaxial with the bolt axis A5.

Further, in some embodiments of the present invention, as shown in FIGS. 12 and 13, the bolt shank 60 may have substantially cylindrical shaped first and second shank portions 68, 70 with first and second diameters D1, D2, respectively, wherein the first diameter D1 is greater than the second diameter D2.

Yet further, in some embodiments of the present invention, the bolt shank 60 may have exactly two bolt locking portions 66, equal to the number of undercut sub-surfaces 54 associated with each undercut 52.

As shown in FIGS. 12 and 13, the two bolt locking portions 66 may be located on the first shank portion 68, and the first shank portion 68 may be situated between the bolt head 62 and the second shank portion 70. The two bolt locking portions 66 may be spaced apart from the bolt head 62.

Also, as shown in FIGS. 12 and 13, a transverse annular surface 72 may separate the first and second shank portions 68, 70, and each of the two bolt locking portions 66 may be in the form of a circular segment of the transverse annular surface 72 extending towards the bolt head 62.

Figure 11:
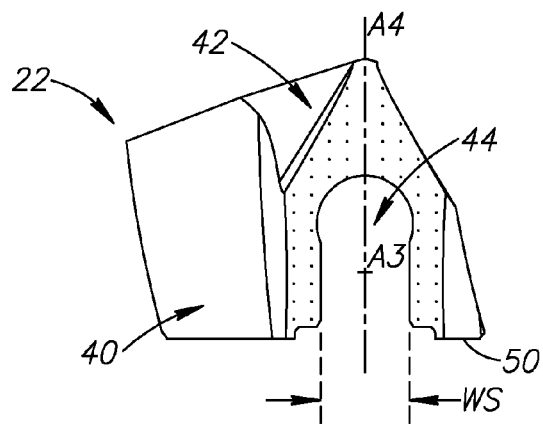
FIG. 11 is a cross-sectional view of the cutting insert shown in FIG. 9, taken along the line XI-XI.

As shown in FIGS. 9 and 11, in a cross-sectional view taken in a third plane P3 perpendicular to the cut-out axis A3 and containing the central axis A4, the cut-out 44 may be slot-shaped having a slot width WS, and the slot width WS may be greater than the second diameter D2 and less than the first diameter D1.

In some embodiments of the present invention, the undercut radius r may be greater than half the first diameter D1.

According to the present invention, the clamping bolt 26 can be rotated about its bolt axis A5;

from a locked position, as shown in FIGS. 3 and 4, wherein the threaded portion 64 is threadingly engaged in the threaded bore 38 and the two bolt locking portions 66 are located directly forward of the two undercut sub-surfaces 54 of one of the two undercuts 52, to an un-locked position wherein the threaded portion 64 remains threadingly engaged in the threaded bore 38 and no portion of the bolt shank 60 is located directly forward of the two undercut sub-surfaces 54 of either one of the two undercuts 52.

In some embodiments of the present invention, the first and second protuberances 28, 30 may have first and second abutment surfaces 74, 76, respectively, and in the locked position, the first and second abutment surfaces 74, 76 may be simultaneously clamped against the first and second side surfaces 46, 48.

Also, in the locked position, the first shank portion 68 may be slidingly engaged in the through bore 36, and the bolt head 62 may be countersunk in the first protuberance 28, In the un-locked position, the first and second abutment surfaces 74, 76 may no longer be simultaneously clamped against the first and second side surfaces 46, 48, and the cutting insert 22 may be slidingly removed from the tool shank 24 in the forward direction F.

Also, in the un-locked position, the first shank portion 68 may remain slidingly engaged in the through bore 36, and the bolt head 62 may be protrude from the first protuberance 28.

For embodiments of the present invention where the cutting insert 22 exhibits two-fold rotational symmetry about the central axis A4, the cutting insert 22 can be oriented in two index positions in the tool shank 24, whereby in each index position a different one of the two undercuts 52 can be operative.

In the locked position, the operative undercut 52 provides a safety feature to prevent the cutting insert 22 from being inadvertently 'pulled' from the tool shank 24, thus eliminating hazards such as the cutting insert 22 becoming separated from its tool shank 24 whilst the cutting tool 20 is rotating.

The operative undercut 52 prevents the cutting insert 22 from being inadvertently 'pulled' from the tool shank 24 by way of the two undercut sub-surfaces 54 associated with the operative undercut 52 coming into contact with the two bolt locking portions 66, and resisting movement of the cutting insert 22 in the forward direction F.

It should be appreciated that during typical cutting operations of the cutting tool 20, the two undercut sub-surfaces 54 associated with the operative undercut 52 may not be in contact with the two bolt locking portions 66.

The present invention is advantageous in that the cutting tool 20 can be 'switched' from its locked position to its un-locked position without having to disengage the threaded portion 64 of the bolt shank 60 from the threaded bore 38.

As shown in FIG. 3, the clamping bolt 26 travels a travel distance DT in a direction along the cut-out axis A3 from the locked position to the un-locked position.

In some embodiments of the present invention, the travel distance DT may be less than a fifth of the insert width WI, so that from the locked position to the un-locked position, the clamping bolt 26 can be rotated about its bolt axis A5 a beneficially low number of revolutions. Consequently, cutting insert removal and replacement can be performed more efficiently.

Preferably, the cutting tool 20 may be configured such that in the locked position the transverse annular surface 72 does not make contact with the cutting insert 22, and the travel distance DT is less than the undercut length LU.

Although the subject matter of the present application has been described to a certain degree of particularity, it should be understood that various alterations and modifications could be made without departing from the spirit or scope of the invention as hereinafter claimed.

What is claimed is:

1. A cutting tool (20) comprising a cutting insert (22) removably securable in a tool shank (24) by means of a clamping bolt (26);

the tool shank (24) extending along a longitudinal axis (A1), and having spaced apart first and second protuberances (28, 30) protruding from an end portion (32) thereof;

the first protuberance (28) having a through bore (36) and the second protuberance (30) having a threaded bore (38), the through bore (36) and the threaded bore (38) extending coaxially along a bore axis (A2), the cutting insert (22) having a body portion (40) and a cutting portion (42);

the body portion (40) having a cut-out (44) extending along a cut-out axis (A3) from a first side surface (46) to an opposing second side surface (48) and opening out to a bottom surface (50) extending therebetween, the cut-out (44) including at least one undercut (52), and the clamping bolt (26) having a bolt shank (60) extending away from a bolt head (62) along a bolt axis (A5);

the bolt shank (60) having a threaded portion (64) distal from the bolt head (62) and at least one bolt locking portion (66), wherein:
the first and second side surfaces (46, 48) are located between the first and second protuberances (28, 30), and each of the at least one undercut (52) has at least one undercut sub-surface (54) with respect to a forward direction (F), and
wherein the clamping bolt (26) can be rotated about its bolt axis (A5);
from a locked position wherein the threaded portion (64) is threadingly engaged in the threaded bore (38) and the at least one bolt locking portion (66) is located directly forward of the at least one undercut sub-surface (54) of one of the at least one undercut (52), to an un-locked position wherein the threaded portion (64) remains threadingly engaged in the threaded bore (38) and no portion of the bolt shank (60) is located directly forward of any of the at least one undercut sub-surface (54) of any of the at least one undercut (52).

2. The cutting tool (20) according to claim 1, wherein the first and second protuberances (28, 30) protrude from the end portion (32) in the forward direction (F), and
wherein the longitudinal axis (A1) is parallel to the forward direction (F).

3. The cutting tool (20) according to claim 1, wherein in the un-locked position, the cutting insert (22) can be slidingly removed from the tool shank (24) in the forward direction (F).

4. The cutting tool (20) according to claim 1, wherein the first and second protuberances (28, 30) have first and second abutment surfaces (74, 76), respectively, and
wherein in the locked position, the first and second abutment surfaces (74, 76) are simultaneously clamped against the first and second side surfaces (46, 48).

5. The cutting tool (20) according to claim 1, wherein the at least one undercut sub-surface (54) of the at least one undercut (52) is substantially parallel to the cut-out axis (A3).

6. The cutting tool (20) according to claim 1, wherein one of the at least one undercut sub-surface (54) of the at least one undercut (52) does not intersect either one of the first and second side surfaces (46, 48).

7. The cutting tool (20) according to claim 1, wherein the bolt axis (A5) is coaxial with the bore axis (A2).

8. The cutting tool (20) according to claim 1, wherein each of the at least one undercut (54) is visible in only one of two side views of the cutting insert (22) along the cut-out axis (A3).

9. The cutting tool (20) according to claim 1, wherein the cut-out (44) has exactly two undercuts (52), and each undercut (52) has exactly two undercut sub-surfaces (54).

10. The cutting tool (20) according to claim 1, wherein the cutting insert (22) has a single cutting portion (42).

11. The cutting tool (20) according to claim 1, wherein the cutting portion (42) is located forward of the body portion (40).

12. The cutting tool (20) according to claim 1, wherein in a cross-sectional view taken in a second plane (P2) perpendicular to the cut-out axis (A3) and intersecting one of the at least one undercut (52), each associated at least one undercut sub-surface (54) has a constant radius (r) with a center point (C) contained in the cut-out axis (A3).

13. The cutting tool (20) according to claim 1, wherein the cut-out axis (A3) is coaxial with the bolt axis (A5).

14. The cutting tool (20) according to claim 1, wherein the bolt shank (60) has substantially cylindrically shaped first and second shank portions (68, 70) with first and second diameters (D1, D2), respectively, and
wherein the first diameter (D1) is greater than the second diameter (D2).

15. The cutting tool (20) according to claim 14, wherein the at least one bolt locking portion (66) is located on the first shank portion (68), and
wherein the first shank portion (68) is situated between the bolt head (62) and the second shank portion (70).

16. The cutting tool (20) according to claim 14, wherein in a cross-sectional view taken in a third plane (P3) perpendicular to the cut-out axis (A3), the cut-out (44) is slot-shaped having a slot width (WS), and
wherein the slot width (WS) is greater than the second diameter (D2) and less than the first diameter (D1).

17. The cutting tool (20) according to claim 1, wherein the first and second side surfaces (46, 48) are planar and parallel to the forward direction (F).

18. The cutting tool (20) according to claim 17, wherein the cut-out axis (A3) forms an acute first angle ($\alpha$) with a first plane (P1) parallel to the first and second side surfaces (46, 48).

19. The cutting tool (20) according to claim 17, wherein
the clamping bolt (26) travels a travel distance (DT) in a direction along the cut-out axis (A3) from the locked position to the un-locked position,
the cutting insert (22) has an insert width (WI) between the first and second side surfaces (46, 48), and
wherein the travel distance (DT) is less than a fifth of the insert width (WI).

20. The cutting tool (20) according to claim 1, wherein the cut-out (44) exhibits two-fold rotational symmetry about a central axis (A4).

21. The cutting tool (20) according to claim 20, wherein the cutting insert (22) exhibits two-fold rotational symmetry about the central axis (A4).

22. The cutting tool (20) according to claim 20, wherein the central axis (A4) is coaxial with the longitudinal axis (A1).

23. A cutting insert (22) comprising a body portion (40) and a cutting portion (42);
the body portion (40) having a cut-out (44) extending along a cut-out axis (A3) from a first side surface (46) to an opposing second side surface (48) and opening out to a bottom surface (50) extending therebetween;
the cut-out (44) including at least one undercut (52), and the at least one undercut (52) having at least one undercut sub-surface (54) with respect to a forward direction (F),
the cutting portion (42) located forward of the body portion (40) along a central axis (A4),
wherein one of the at least one undercut sub-surface (54) of each of the at least one undercut (52) does not intersect either one of the first and second side surfaces (46, 48).

24. The cutting insert (22) according to claim 23, wherein the at least one undercut sub-surface (54) of each of the at least one undercut (52) is substantially parallel to the cut-out axis (A3).

25. The cutting insert (22) according to claim 23, wherein each of the at least one undercut (52) is visible in only one of two side views of the cutting insert (22) along the cut-out axis (A3).

26. The cutting insert (22) according to claim 23, wherein the first and second side surfaces (46, 48) are planar and parallel to the forward direction (F).

27. The cutting insert (22) according to claim 26, wherein the cut-out axis (A3) forms an acute first angle ($\alpha$) with a first plane (P1) parallel to the first and second side surfaces (46, 48).

28. The cutting insert (22) according to claim 26, wherein the at least one undercut sub-surface (54) of each of the at least one undercut (52) extends an undercut length (LU) with respect to the cut-out axis (A3), the cutting insert (22) has an insert width (WI) between the first and second side surfaces (46, 48), and wherein the undercut length (LU) is less than a fifth of the insert width (WI).

29. The cutting insert (22) according to claim 23, wherein the cut-out (44) exhibits two-fold rotational symmetry about the central axis (A4).

30. The cutting insert (22) according to claim 23, wherein the cutting insert (22) exhibits two-fold rotational symmetry about the central axis (A4).

* * * * *